United States Patent
Geiginger et al.

[19]

[11] Patent Number: 6,118,231
[45] Date of Patent: Sep. 12, 2000

[54] CONTROL SYSTEM AND DEVICE FOR CONTROLLING THE LUMINOSITY IN A ROOM

[75] Inventors: Joachim Geiginger, Hohenems; Armin Heim, Bregenz; Gerhard Jahn, Lochau, all of Australia

[73] Assignee: Zumtobel Staff GmbH, Dornbirn, Austria

[21] Appl. No.: 09/147,196

[22] PCT Filed: May 13, 1997

[86] PCT No.: PCT/EP97/02441

§ 371 Date: Oct. 27, 1998

§ 102(e) Date: Oct. 27, 1998

[87] PCT Pub. No.: WO97/43705

PCT Pub. Date: Nov. 20, 1997

[30] Foreign Application Priority Data

May 13, 1996 [DE] Germany .......................... 196 19 281

[51] Int. Cl.[7] .................................................. H05B 137/00
[52] U.S. Cl. .................... 315/312; 315/294; 315/318; 315/316; 315/324; 362/233
[58] Field of Search ..................... 315/291, 292, 315/293, 294, 295, 360, 362, 312, 316, 317, 318, 319, 320, 324; 362/85, 233

[56] References Cited

U.S. PATENT DOCUMENTS

| | | | |
|---|---|---|---|
| 4,772,825 | 9/1988 | Tabor et al. | 315/312 |
| 5,010,459 | 4/1991 | Taylor et al. | 315/292 |
| 5,254,908 | 10/1993 | Alt et al. | 315/312 |
| 5,406,176 | 4/1995 | Sugden | 315/312 |
| 5,530,322 | 6/1996 | Ference et al. | 315/316 |
| 5,648,656 | 7/1997 | Begemann et al. | 315/150 |
| 5,714,808 | 2/1998 | Ansel et al. | 315/362 |

OTHER PUBLICATIONS

Clemens Troop, "Lichtmanagement bringt zahlreiche Vorteile", ("Light Management Brings Numerous Advantages"), etz, vol. 113, 1992, No. 2, pp. 84–87.

"Integriertes Lichtmanagement bringt optimalen Energieeinsatz", (Integrated Light Management Provides Optimal Use of Energy) LICHT, 7–8, 1995, pp. 578–580.

*Primary Examiner*—Don Wong
*Assistant Examiner*—Wilson Lee
*Attorney, Agent, or Firm*—Fitzpatrick, Cella, Harper & Scinto

[57] ABSTRACT

In order to control the luminosity in a room (1) lighted with several light sources (2a . . . , 3a . . . ) or several groups of light sources, a system is used with which the ratio between the light intensities of the individual light sources or groups of light sources can be adjusted or modified, and with which the total luminosity in the room (1) can be adjusted or modified while the ratio between the light intensities of the individual light sources or groups of light sources is kept constant. In particular for this purpose, a control device (7) is integrated in the system and connected to all operating devices (4a . . . , 5a . . . ) of the various light sources (2a . . . , 3a . . . ) to control the power consumption of the individual light sources (2a . . . , 3a . . . ).

23 Claims, 4 Drawing Sheets

CONTROL SYSTEM AND DEVICE FOR CONTROLLING THE LUMINOSITY IN A ROOM

BACKGROUND OF THE INVENTION

Field of the Invention

The invention relates to a system and a control device and to a use of the system for controlling the brightness of a room illuminated by a plurality of light sources or a plurality of groups of light sources.

DESCRIPTION OF THE RELATED ART

More recent lighting systems operate with a plurality of different light sources, in particular direct and indirect light sources. Previously the light sources, such as for example lamps or light fittings, could be dimmed or switched only independently of one another. Consequently it was not possible, or possible only with great difficulty, for example to change the ratio between direct and indirect light and at the same time to keep the overall brightness constant.

In practice a light management system of the Applicant is already known which, in the form of an "intelligent" light control system, can individually create different lighting moods in a room and at the same time take into account the prevailing incoming daylight. This system has been described for example in the scientific article "Light Management Brings Numerous Advantages" by C. Tropp in "etz", Vol. 113, 1992, no. 2, p. 84–87 and in the scientific article "Integrated Light Management Provides Optimal Use of Energy" in "Licht", Vol. 7–8,/1995, p. 578–580.

In the case of the known light management system of the Applicant, the user can activate, switch on and off, and dim individual lights and groups of lights, i.e. create his own lighting moods, via an infrared remote control device or an operating device. By the depression of pushbuttons a plurality of stored lighting moods can be called up in accordance with different office activities. The data transmission to the individual lights and groups of lights is effected by a bus system based on modern two-wire control technology.

SUMMARY OF THE INVENTION

The object of the present invention is to provide a system and a control device for controlling the brightness of a room with extended adjustment facilities for the user, which permits the coupling of the different light sources or groups of light sources so that the light intensities of the individual light sources or groups of light sources can be controlled adapted to one another in accordance with the user settings, i.e. the user need only set parameters of the overall system and not however the parameters of each individual light source.

This object is achieved by a system and control device for controlling the brightness of a room illuminated by a plurality of light sources or a plurality of groups of light sources, wherein the ratio of the light intensities of the individual light sources or groups of light sources can be set or changed and additionally the overall brightness of the room can be set or changed while maintaining a constant ratio of the light intensities of the individual light sources or groups of light sources.

A possible application of the system according to the invention consists in its use in a light fitting comprising at least two separately actuatable lighting means, where one lighting means serves for the direct lighting of the room and a further lighting means serves for the indirect lighting of the room.

Further developments and embodiments of the invention are described in the further detail herein.

BRIEF DESCRIPTION OF THE DRAWINGS

The construction and mode of functioning of an exemplary embodiment of the invention will now be explained making reference to the drawing wherein.

DETAILED DESCRIPTION OF THE PREFERRED EMBODIMENT

Figure 1:
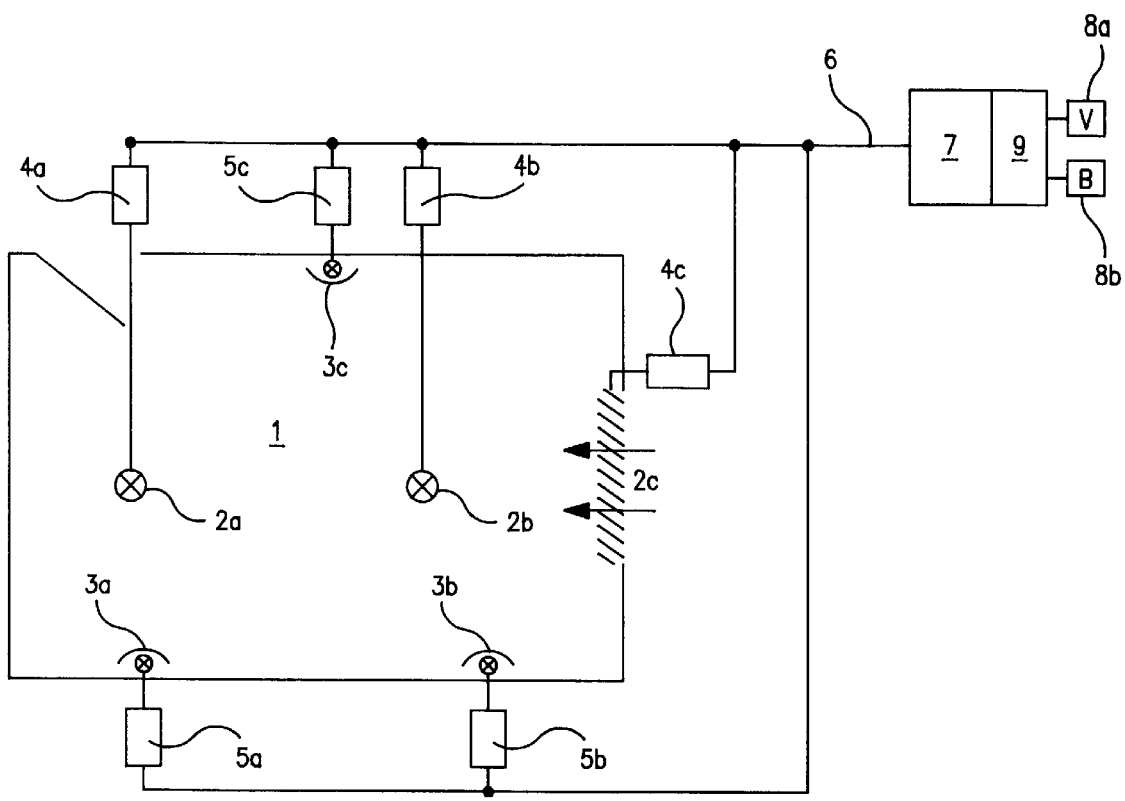
FIG. 1 schematically illustrates an exemplary embodiment of the system according to the invention.

An exemplary embodiment of the system according to the invention is schematically illustrated in FIG. 1. A room 1 to be lighted contains a plurality of groups of light sources; a first group consists of two direct light sources 2a and 2b in the form of commercially available ceiling lamps while the second group consists of the direct light source 2c in the form of daylight entering through a window of the room 1, the light intensity of which can be set for example by adjustable slatted blinds, and the third group consists of three indirectly radiating light sources 3a, 3b and 3c in the form of indirectly radiating wall lamps. In place of the light sources used in this exemplary embodiment, in principle it is also possible to use any conceivable type of light source whose light intensity can be changed.

The direct light sources 2a and 2b are connected to the associated operating devices 4a and 4b, the slatted blind for regulating the incoming daylight is connected to the associated operating device 4c, and the indirect light sources 3a, 3b and 3c are connected to the associated operating devices 5a, 5b and 5c. All the forementioned operating devices 4a, . . . and 5a, . . . of the various light sources in the room 1 are connected via a bus 6 to a control device 7. Via the bus 6 this control device 7 controls the power consumption of the individual operating devices 4a, . . . and 5a, . . . and thus controls the light intensities of the individual light sources 2a, . . . and 3a, . . . in the room 1.

Two operating elements 8a and 8b are arranged on the control device 7. These operating elements 8a and 8b enable the user of the system to set and change the parameter "volume", i.e. the overall brightness of the room 1, and the parameter "balance", i.e. the ratio between the light intensities of the direct and indirect light sources.

The operating elements 8a and 8b can consist for example of known double control switches for lighter/darker adjustment and for on/off switching, and of known knob control switches for setting the ratio between the light intensities. In place of the forementioned conventional installation technology (control switches, potentiometers etc.) the parameters can also be set or changed by the transmission of digital data to the control device.

The operating elements 8a and 8b need not necessarily be arranged directly on the control device 7 but can equally be arranged on an external operating unit connected to the control device 7 via an electric connection or radio signals for the transmission of the set values "volume" and "balance".

It can also be seen from FIG. 1 that the control device comprises a non-volatile memory 9 in which all the configurations can be stored. These configurations also include the preset parameters, which are required in addition to the parameters "volume" and "balance" set via the operating elements 8a and 8b, for controlling the light intensities. These preset parameters can include: the sensitivity of the human eye, the dependency of the light intensity upon the power impressed upon the light source, the lighting technology properties of the light fitting or the reflective properties of the room to be illuminated. The use of these preset parameters will be explained later in the description.

Figure 2:
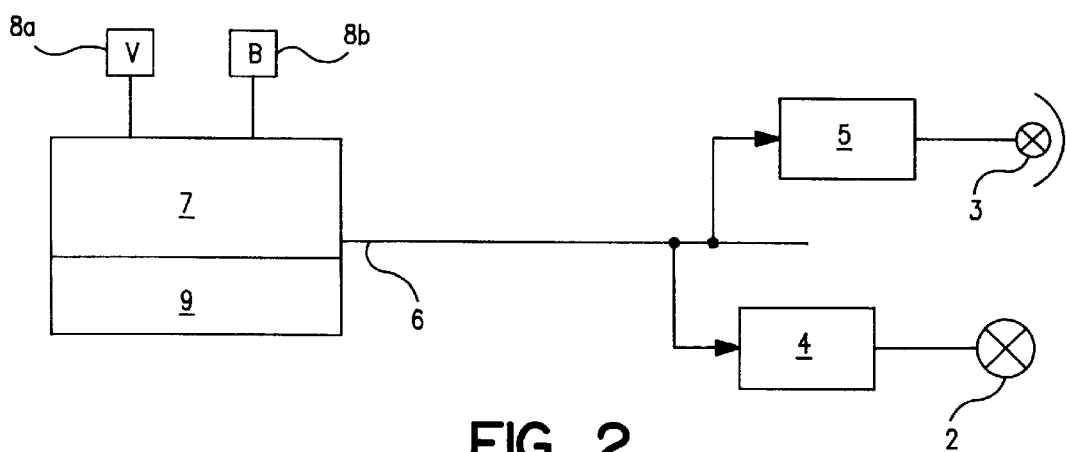
FIG. 2 is a block circuit diagram of a simplified system according to FIG. 1.

FIG. 2 is a simplified diagram of the above described system in the form of a block circuit diagram. In place of the six operating devices 4a, ... and 5a, ... according to FIG. 1, here only two operating devices 4 and 5 are connected to the bus 6 of the control device 7. The light intensity of the direct light source 2 of the operating device 4 is controlled via the channel 1 of the control device 7 and the light intensity of the indirect light source 3 of the operating device 5 is controlled via the channel 2 of the control device 7.

Figure 4A:
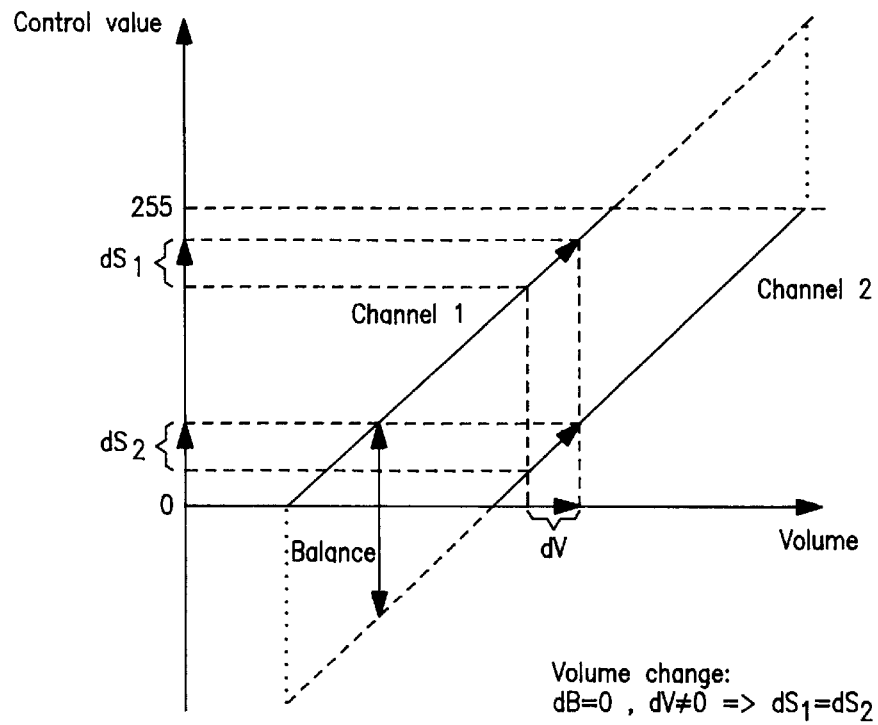
FIGS. 4a, b illustrate two diagrams in explanation of the mode of functioning of the system according to the invention
Figure 4B:
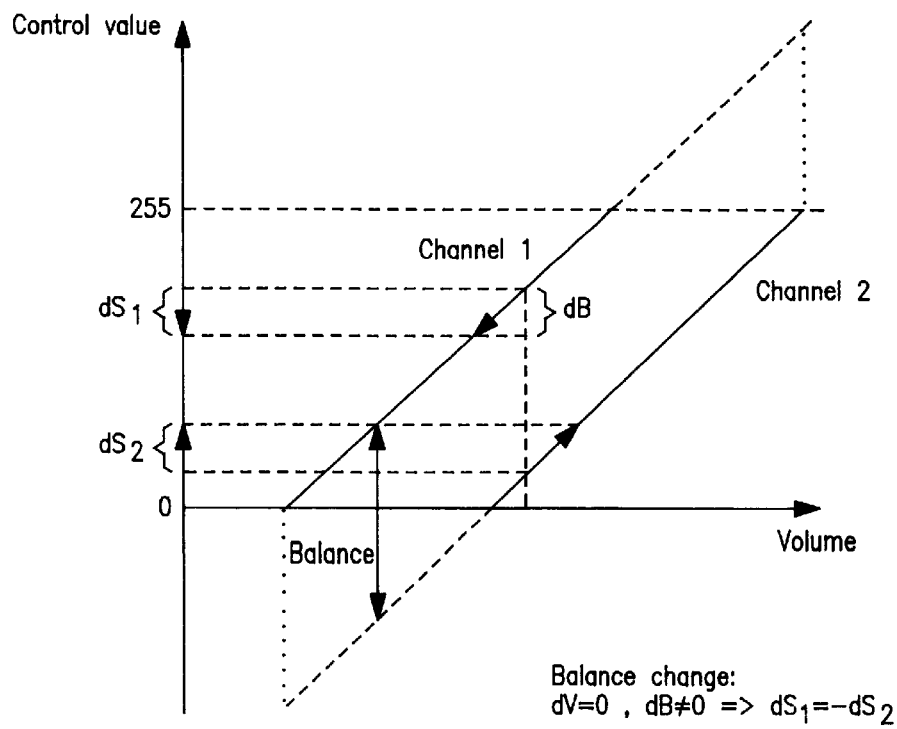

Via the channels 1 and 2, from the control device 7 the corresponding power consumption control values $S_1$ and $S_2$ are fed to the operating devices 4 and 5. In FIGS. 4a and 4b these control values $S_1$ and $S_2$ for channel 1 and channel 2 have been plotted as a function of the parameter "volume", i.e. the overall brightness, in a logarithmic diagram.

Figure 3A:
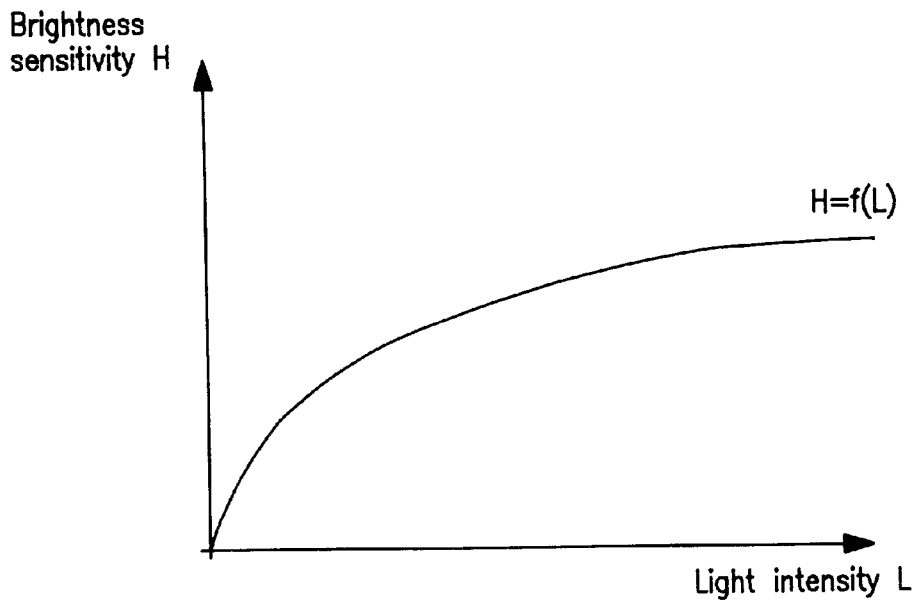
FIGS. 3a, b show two diagrams in explanation of the logic relationship between the control values of the control device and the brightness.

The logic relationship between the control values and the brightness, which leads to the indicated control value characteristics of channel 1 and channel 2, will be explained in the following making reference to FIG. 3. In the diagram in FIG. 3a the sensitivity to brightness H of the human eye is plotted over the light intensity L of a light source. The human eye is more sensitive to the difference in brightness between two light sources of weak light intensity than the difference in brightness between two light sources of strong light intensity. A logarithmic relationship between H and L results.

Figure 3B:
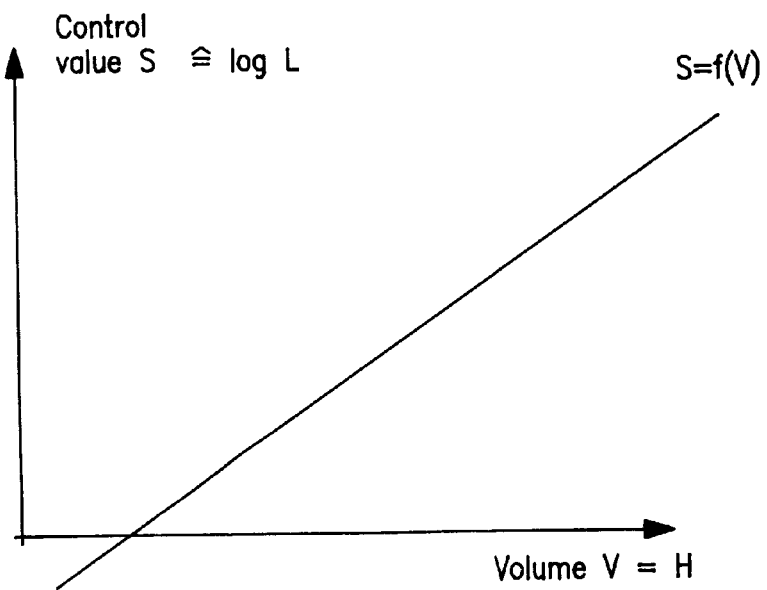

If, in place of the linear axial scaling of L, logarithmic plotting over L is selected, in the diagram a straight line occurs as the relationship between H and L. In FIG. 3b the two axes have now been transposed, i.e. the brightness sensitivity H has been plotted as the abscissa of the coordinate system and the light intensity has been plotted with logarithmic scaling as the ordinate of the coordinate system. The parameter "volume" V of the control device 7 corresponds to the brightness sensitivity H and the control value S corresponds to the logarithm of the light intensity L. This leads to a characteristic of the control value S over the parameter "volume" V in the form of a straight line which generally is not an originating line.

For the two channels 1 and 2 the respective control value characteristics of the control values $S_1$ and $S_2$ have now been entered in the diagrams of FIGS. 4a and 4b. The distance between the two parallel characteristics of the control value $S_1$ of channel 1 and the control value $S_2$ of channel 2 is determined by the parameter "balance", i.e. by the ratio of the light intensities of the two light sources 2 and 3.

The value ranges for the two control values $S_1$ and $S_2$ are between 0 and 255, while the value range of the parameter "volume" is between 0 and 255 and the value range of the parameter "balance" is between -255 and 255.

FIG. 4a now illustrates what occurs when the user changes the parameter "volume" via the operating element 8a. Upon the change in the parameter "volume", the light intensities of the two channels are changed in the same direction, at which time the user is unable to change the ratio between the light intensities. On account of the logarithmic characteristic this is the case whenever the control value difference $(S_1-S_2)$ between the two channels is constant. Upon a change in the parameter "volume" by dV, the two control values change by the same amount and in the same direction by $dS_1$ and $dS_2$.

FIG. 4b illustrates the situation in which the user changes the parameter "balance" via the operating element 8b. Upon the change in the parameter "balance", the one channel is to be reduced by precisely the light intensity value by which the other channel is increased, at which time the user is unable to change the overall brightness. On account of the logarithmic characteristic this is the case whenever the control value of the one channel is reduced by the value by which the control value of the other channel is increased. In the event of a change in the parameter "balance" by dB, the two control values thus change by the same amount in the opposite direction by $dS_1$ and $dS_2=-dS_1$.

Figure 5:
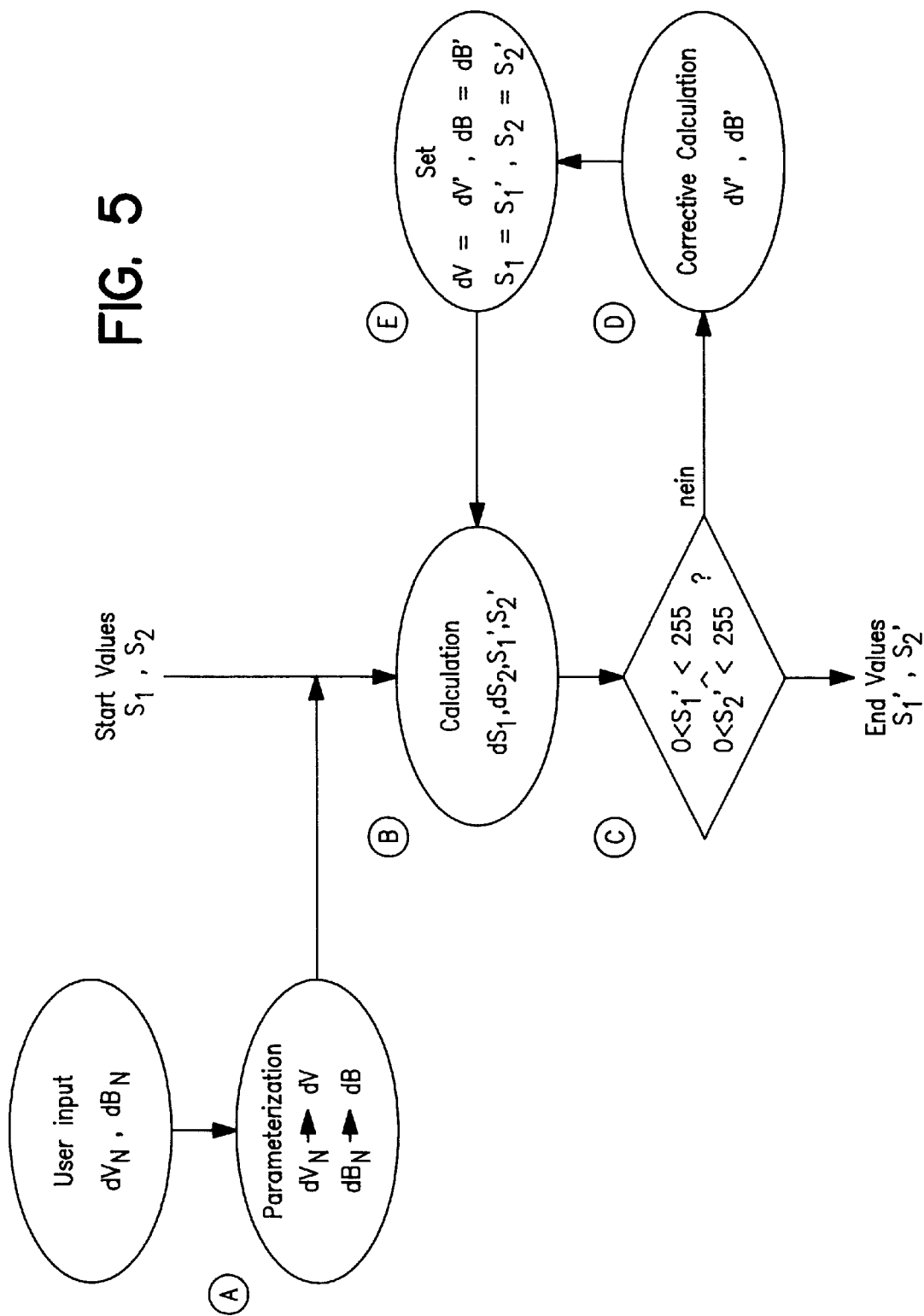
FIG. 5 is a flow diagram in explanation of the mode of functioning of the system according to the invention.

The precise calculation of the change in the control values $dS_1$ and $dS_2$ upon a change in the parameters by dV and dB will be explained in the following making reference to FIG. 5. FIG. 5 is a flow diagram for the calculation of the new control values $S'_1$ and $S'_2$ on the basis of parameter changes $dV_N$ and $dB_N$ by the user. The calculation comprises the following steps:

A) Parameterization of the changes $dV_N$ and $dB_N$ input by the user by a non-linear coordinate transformation using the above indicated preset parameters in order to obtain suitable parameter changes dV and dB for the calculation of the control values $S'_1$ and $S'_2$:

$$\begin{matrix} dV \\ dB \end{matrix} = P * \begin{matrix} dV_N \\ dB_N \end{matrix} \qquad (1)$$

wherein P is a matrix which takes into account the preset parameters.

B) Calculation of the changes in the control values $dS_1$ and $dS_2$ on the basis of the parameterized changes dV and dB:

$$dS_1=dV-dB \text{ and } dS_2=dV+dB \qquad (2)$$

and calculation of the new control values $S'_1$ and $S'_2$:

$$S'_1=S_1+dS_1 \text{ and } S'_2=S_2+dS_2 \qquad (3)$$

C) Checking whether the two control values $S'_1$ and $S'_2$ fall in the permitted value range between 0 and 255. If this is the case, the control values $S'_1$ and $S'_2$ just calculated can be adopted as new control values of the system. If at least one of the two control values $S'_1$ or $S'_2$ falls outside the valid value range between 0 and 255, a corrective calculation must be performed in accordance with step D).

D) Corrective calculation whereby the control value $S'_i$ (i=1 or 2) falling outside the valid value range between 0 and 255 is set at a value inside this value range:

$$dV'=-(S'_i-D)/2 \text{ and } dB'=+(S'_i-D)/2 \qquad (4)$$

wherein D is the value of an upper and lower dimming limit which is not to be over- or undershot during the operation of the light sources. This value D can also assume the limit values of the value range 0 and 255 but must not lie outside of the value range between 0 and 255. In particular in the case of the lower dimming limit, a value D>0 is often selected, as will be explained later in the description.

E) If a corrective calculation has been performed in accordance with step D), the parameters are now reset such that a further calculation can be made in accordande with step B):

$$dV-dV', dB=dB', S_1=S'_1, S_2=S'_2 \qquad (5)$$

The corrective calculation (4) in step D) is conceived such that the loop comprising steps D) and E) need be run through only once, i.e. the control values $S'_1$ and $S'_2$ fall within the valid value range after a maximum of one correction.

To clarify the above described calculation of the new control values $S'_1$ and $S'_2$, in particular in the case of a corrective calculation, this calculation will now be performed in the form of a concrete numerical example.

It will be assumed that the start values $S_1=210$ and $S_2=120$ have been selected as control valus for the channels 1 and 2; the upper dimming limit will be assumed to correspond to the upper limit of the value range, thus D=255. The changes input by the user following the parameterization (step A) in accordance with equation (1) will be assumed to be dV=+80 and dB=0, i.e. it will be assumed that the user wishes to increase the overall brightness of the room 1 (dV>0) while maintaining a constant ratio of the light intensities (dB=0).

In accordance with equation (2) in step (B) the changes in the control values result in $$dS_1=+80-0=+80 \text{ and } dS_2=+80+0=+80.$$

from which, in accordance with equation (3), the values of the new control values are calculated:

$$S'_1=210+80=290 \text{ and } S'_2=120+80=200.$$

The result of the checking of the two control values $S'_1$ and $S'_2$ in step C) is that the first control value $S'_1$ lies outside of the valid value range ($S'_1>255$). The control values $S'_1$ and $S'_2$ which have just been calculated thus cannot be adopted as new control values and a corrective calculation in accordance with step D) must be performed.

In accordance with equation (4) the corrected changes dV' an dB' result in $$dV'=-(290-255)/2=-17.5 \text{ and } dB'=+(290-255)/2=+17.5.$$

Now in step E) the calculated control values $S'_1$ and $S'_2$ and the corrected changes dV' and dB' are set as start values and step B is performed again in order to calculate the new valid control values. The calculation in accordance with equations (3) and (4) now yields:

$$dS_1=-17.5-(+17.5)=-35 \text{ and } dS_2=-17.5-(-17.5)=0, S'_1=290+(-35)=255 \text{ and } S'_2=200+0=200.$$

The new control value $S'_1$ now lies within the valid value range so that the last calculated control values $S'_1=255$ and $S'_2=200$ can now be fed via the two channels 1 and 2 to the associated operating devices 4 and 5 respectively.

The values of the lower and upper dimming limit D are configured in the non-volatile memory 9 during the production. On the basis of the selection of the lower dimming limit as D>0 or D=0, it is possible to predetermine the type of on/off switching.

In the former case D>0 the light sources of the two channels are commonly switched on and commonly switched off. This means that the channel with the lower control value remains at the lower dimming limit and does not change to the control value 0 until the control value 0 also occurs for the other channel, and that the channel with the lower control value is set at the lower dimming limit upon the switching on of the other channel and remains not switched off.

In the other case in which D=0, the light sources are switched on and off separately from one another in general, i.e. except when B=0. This means that the channel with the lower control value is switched off when the control value 0 occurs for this channel while the other channel with the higher control value remains switched on, and that the channel with the lower control value remains switched off upon the switching on of the other channel until a control value greater than 0 also occurs for this channel.

In addition to the example of use of the system according to the invention illustrated in FIGS. 1 and 2, a further possible application consists in the use of the system and control device in a light fitting comprising at least two separately actuatable lighting means. Here at least one lighting means serves for the direct lighting of the room and at least one further lighting means serves for the indirect lighting of the room so that via the operation of the control device of the light, similarly to the room lighting in accordance with FIG. 1, the user is able to adjust both the overall brightness of the room and also the ratio between the light intensities of the direct and indirect lighting.

What is claimed is:

1. In combination with a system for controlling the brightness of a room illuminated by a plurality of individual light sources or groups of light sources, wherein the ratio of the light intensities of the individual light sources or groups of light sources can be set or changed:

a control device connected to each of said individual or groups of light sources; and two control elements connected to said control device, said control device being operative in response to the adjustment of one of said control elements to change the intensity of each of said light sources in a manner to change the overall brightness of the room while maintaining a constant ratio of the brightnesses of the individual light sources or groups of light sources, and said control device also being operative in response to the adjustment of the other control element to change the ratio of the brightnesses of the individual light sources or groups of light sources.

2. A system according to claim 1, further including a control device which is connected to operating devices of each of said light sources to control the power consumption of individual ones of said light sources.

3. A system according to claim 2, wherein said control device has at least two operating elements arranged respectively to set the overall brightness and the ratio of the brightness of the light sources.

4. A system according to claim 3, wherein, in response to parameters which are set via the operating elements, the control device (7) calculates control values for said operating devices taking into account preset parameters of the system to control the power consumption of said operating devices.

5. A system according to claim 3 or 4, wherein the operating elements are arranged directly on one of the control device and an external operating device which is connected to the control device via at least one of an electric connection and radio signals.

6. A system according to one of claims 3 and 4, wherein the operating elements have the form of digital input elements for the transmission of digital data to the control device.

7. A system according to one of claims 2 to 4, wherein the control device has a non-volatile memory for the permanent storage of preset parameters and configurations.

8. A system according to claim 7, wherein the control device is configured for at least one of common and separate on/off switching of the individual light sources.

9. A system according to one of claims 2 to 4, wherein the control device is connected via a bus to the operating devices of the light sources for the control of the operating devices.

10. A system according to claim 4, wherein for each light source or group of light sources the control device has a channel which feeds a calculated control value of an associated operating device to such operating device.

11. A system according to one of claims 4 or 10, wherein the control device, in calculating the control values for the operating devices, takes into account the logarithmic relationship between the sensitivity to brightness of the human eye and the light intensities of the light sources.

12. A system according to claim 1, wherein the system is configured to control not only artificial light sources but also daylight entering a room, the light intensity of which is regulated via room darkening devices.

13. A system according to claim 1, wherein the control device is integrated in a housing together with the operating devices.

14. A system according to claim 1, wherein at least one of the control devices and the operating devices is integrated in at least one of the light sources.

15. A method of using a system according to one of claims 1, 2, 3, 4, 10, 12, 13 and 14, in a light fitting comprising at least two separately actuatable lighting means.

16. A method of using a system according to claim 15, wherein at least one lighting means of the light fitting is arranged to provide direct lighting of a room and at least one further lighting means is arranged to provide indirect lighting of a room.

17. A control device for use in controlling the brightness of a room which is illuminated by a plurality of individual light sources or groups of light sources, such that the ratio of the light intensities of the individual light sources or groups of light sources can be set or changed, said control device comprising:

input connections for receiving inputs corresponding to volume and balance values, respectively;

an output bus including a channel for connection to at least one direct light source and a channel for connection to at least one indirect light source; and interconnections between said connections and said bus which, in response to the adjustment of one of said inputs, supplies power to said bus to change the brightness of each of said light sources in a manner to change the overall brightness of the room while maintaining a constant ratio of the brightnesses of the individual light sources or groups of light sources, and in response to the adjustment of the other of said inputs to supply power to said bus to change the ratio of brightnesses of the individual light sources or groups of light sources.

18. A control device according to claim 17 wherein said device further includes a non-volatile memory for the permanent storage of preset parameters and configurations.

19. A control device according to claim 17 wherein said control device is configured for at least one of common and separate on/off switching of individual light sources.

20. A control device according to claim 17 wherein said control device is configured to be connected via said bus to operating devices of light sources for the control of said operating devices.

21. A control device according to claim 17 wherein said interconnections are arranged to change the intensity of said light sources according to factors which include the logarithmic relationship between the sensitivity to brightness of the human eye and the light intensities of light sources to be controlled by said control device.

22. A control device according to claim 21 wherein said interconnections are configured to control not only artificial light but also daylight entering a room, the light intensity of which is regulated via room darkening devices.

23. A control device according to claim 17 further including a housing which contains said interconnections as well as operating devices.

* * * * *